United States Patent [19]
Cooper

[11] Patent Number: 5,579,484
[45] Date of Patent: Nov. 26, 1996

[54] SYSTEM FOR PERFORMING FAST DATA ACCESSING IN MULTIPLY/ACCUMULATE OPERATIONS WHILE USING A VRAM

[75] Inventor: Robert W. Cooper, Waterloo, Canada

[73] Assignee: NCR Corporation, Dayton, Ohio

[21] Appl. No.: 659,861

[22] Filed: Feb. 22, 1991

[51] Int. Cl.⁶ .............................. G06F 3/14; G06F 13/10
[52] U.S. Cl. .............................. 395/200.08; 365/189.08; 345/150
[58] Field of Search ...................................... 395/800, 400, 395/425, 250, 375, 325, 500, 100, 725, 550; 340/750; 365/78, 189.08, 230.05; 364/DIG. 1, DIG. 2

[56] References Cited

U.S. PATENT DOCUMENTS

| 4,511,965 | 4/1985 | Rayaram | 340/750 |
| 4,745,577 | 5/1988 | Ogawa et al. | 365/78 |
| 5,148,524 | 7/1992 | Harlin et al. | 364/DIG. 2 |
| 5,197,140 | 3/1993 | Balmer | 395/400 |

FOREIGN PATENT DOCUMENTS 0234181  9/1978  European Pat. Off. .

OTHER PUBLICATIONS

1990 IEEE International Conference on Computer Design, "Parallel Digital Image Restoration Using Adaptive VLSI Neral Chips", pp. 126–129, Lee et al.

Primary Examiner—Daniel H. Pan
Attorney, Agent, or Firm—Elmer Wargo

[57] ABSTRACT

A system and method are described which provide for fast sequential access of stored data, as required, for example, in the performance of multiply/accumulate operations in neural network calculations and other sequential computations. The system includes a video dynamic random access memory (VRAM) with a shift register, a digital signal processor (DSP), and a data/address/control bus for coupling the DSP and VRAM. The VRAM has a parallel access port and a serial access port, and the DSP has a first input–output (I/O) port and a second I/O port. The second I/O port of the DSP is coupled, via the bus, to the parallel- and serial-access ports of the VRAM. In response to data applied via the first I/O port, the DSP transfers the applied data, via the second I/O port, the data bus, and the parallel (or serial) access port, to the VRAM for storage. The stored data is then accessed (by the DSP) as a serial sequence via the serial access port. The method employed by the system in providing such access includes the steps of transferring the stored data in parallel to the shift register, and outputting the data as a synchronized (clocked) serial sequence from the shift register.

14 Claims, 6 Drawing Sheets

5,579,484

SYSTEM FOR PERFORMING FAST DATA ACCESSING IN MULTIPLY/ACCUMULATE OPERATIONS WHILE USING A VRAM

BACKGROUND OF THE INVENTION

This invention relates to computer memory access systems generally, and particularly to systems which provide for fast sequential data access, useful in sequential computation operations such as multiply/accumulate operations required, for example, in neural network calculations.

In performing neural network calculations, a large number of multiply/accumulate operations are performed. Typically, a DSP (digital signal processor) is used to perform these calculations because it can complete a multiply and accumulate operation in a single memory access cycle (generally, within 75–125 nanoseconds). However, to provide a low cost, high performance neural network operation, a large sequentially accessed table of static weights (data values) must be available to the DSP. If the data values from this table, which is sequentially accessed, cannot be supplied within the access cycle time (i.e., within 75–125 nanoseconds), the DSP is obliged to wait for the data; in which event, the full speed of the DSP would not be utilized.

An SRAM (fast static random access memory) is capable of providing a DSP with data at a sufficiently fast rate (i.e., within 75–125 nanoseconds). However, an SRAM carries with it the disadvantages of high cost and high power dissipation.

What is needed and would be useful, therefore, is a lower cost system which could provide both fast memory access and fast multiply/accumulate operation, as would be required for example in neural network calculations.

SUMMARY OF THE INVENTION

A VRAM (video dynamic RAM) with a serial access port is disclosed for use with a DSP (Digital Signal Processor) for providing fast sequential access to stored data such as neural network weights.

According to one aspect of the invention, a data access system is provided which includes a memory for storing data, a processor, and a data bus.

The memory has a parallel access port and a serial access port, and the processor has a first input–output port and a second input–output port. The data bus couples the second input–output port of the processor to the parallel and serial access ports of the memory. The processor is responsive to data applied via the first input–output port for transferring the applied data, via the second input–output port, the data bus, and the parallel access port, to the memory for storage. The stored data is then accessed by the processor as a serial sequence via the serial access port.

According to a second aspect of the invention, a method is provided for sequentially accessing data stored in a memory using a shift register. The method includes the steps of specifying an address of a group of the data for access, transferring the group of data in parallel to the shift register, specifying a count corresponding to the number of shifts of the shift register, and outputting the group of data as a serial sequence in accordance with the count.

DESCRIPTION OF THE PREFERRED EMBODIMENT

Figure 1:
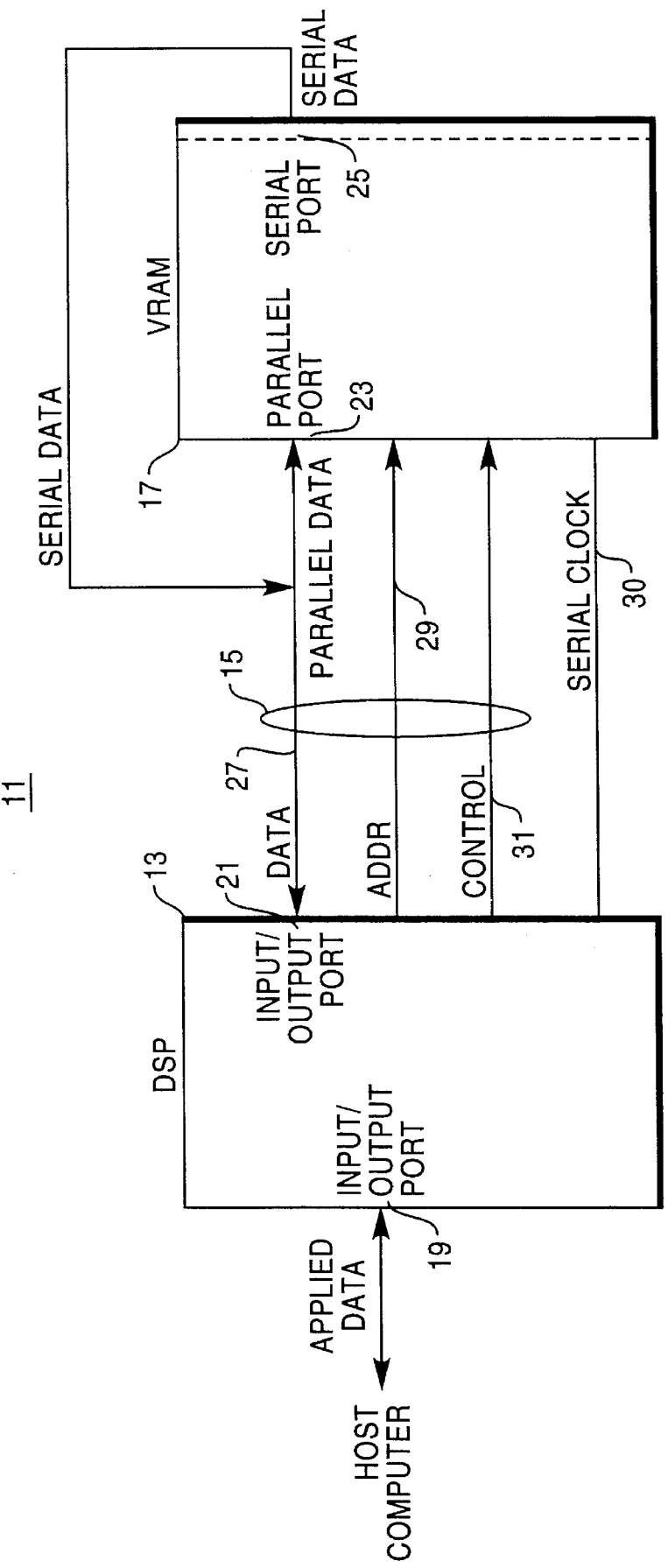
FIG. 1 is a block diagram of a system of the present invention, including a DSP (digital signal processor), a data/address/control bus, and a VRAM (video DRAM)

Referring now to FIG. 1, there is shown a system 11 which embodies the present invention. The system includes a processor 13, a data/address/control bus 15, and a memory 17.

The processor 13 has an input/output port 19 for receiving data (e.g., data such as input variables or weight values) from an external source such as a host computer (not shown), and for outputting information to the host computer. The processor 13 also has a second input/output port 21 for accessing (reading from and writing to) the memory 17. The memory has a parallel port 23 for receiving data from or transmitting data to the processor 13. To access data stored in the memory via this parallel port 23, the address of each stored data value (element) is supplied, and the memory is randomly accessed, by the processor 13. The memory 17 also has a serial port 25 for receiving data from and transmitting data to the processor 13. Data stored in the memory are generally arranged in matrix form. A matrix location is accessible by specifying individual row and column addresses of the location.

Figure 2:
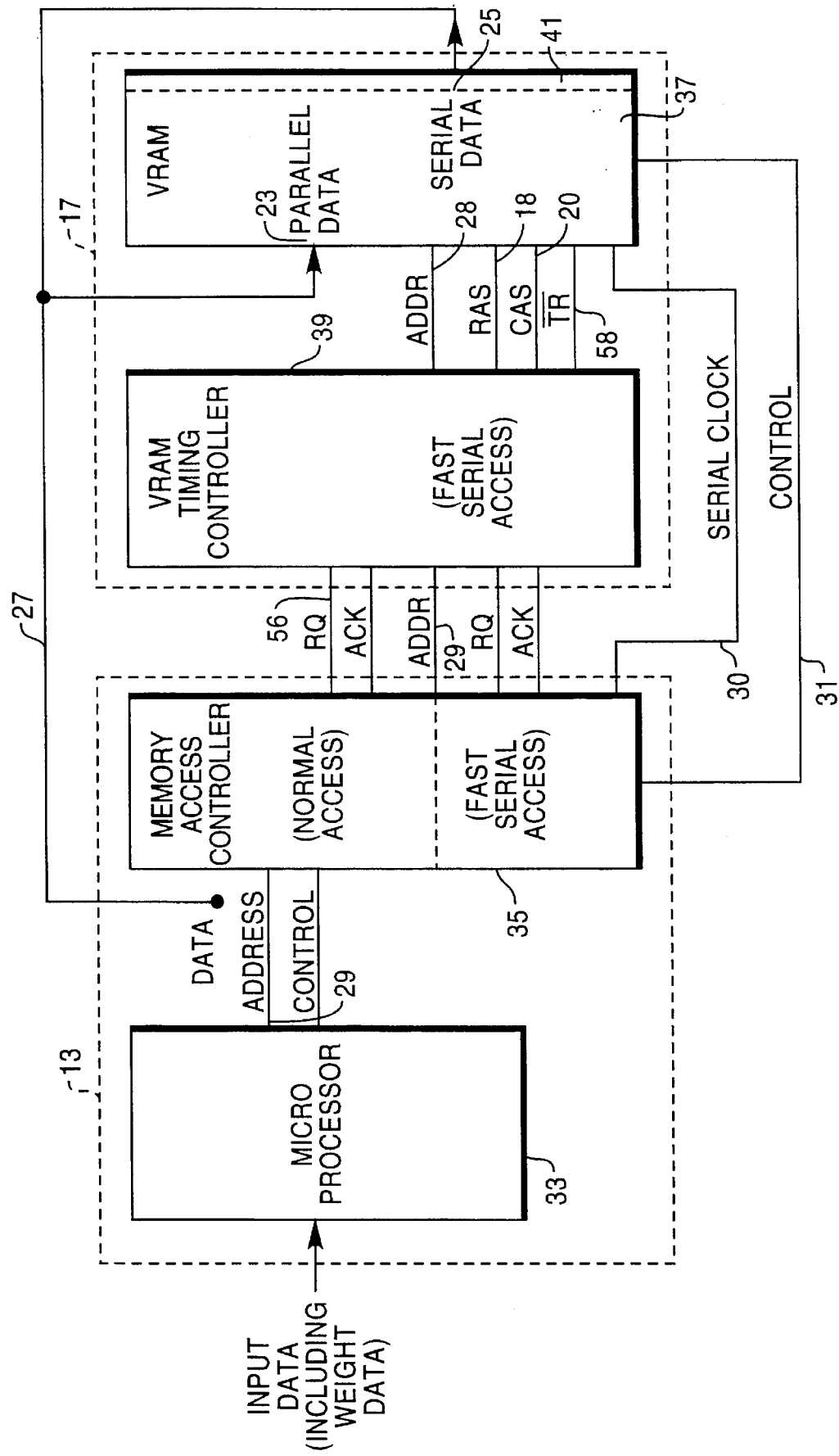
FIG. 2 is a block diagram of the system of FIG. 1 in greater detail, including a memory access controller.

As shown in FIG. 2, the memory 17 includes a VRAM memory chip 37 with an internal shift register 41, and a VRAM timing controller 39.

Figure 4:
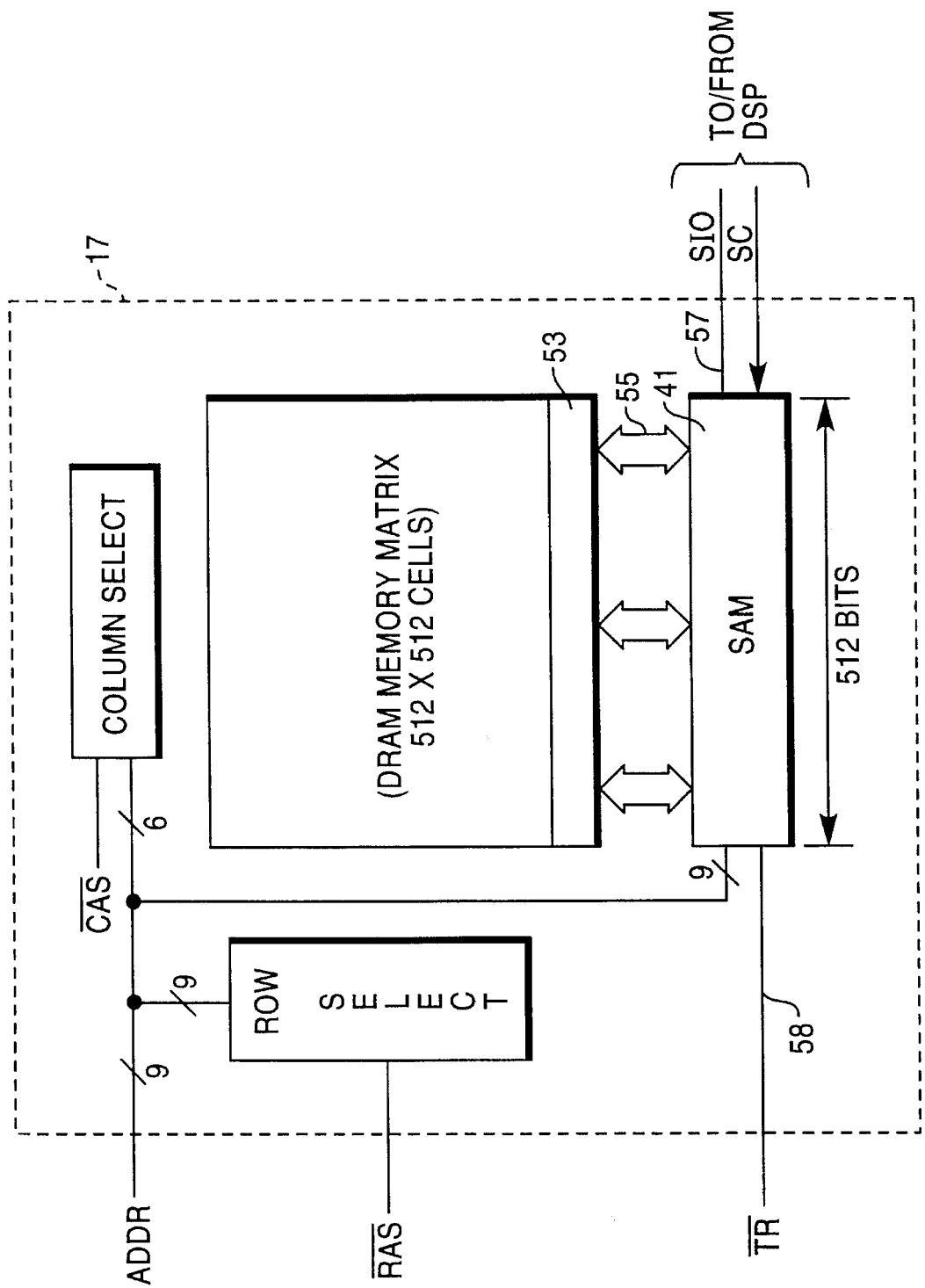
FIG. 4 is a block diagram of the VRAM employed in the system of FIG. 1.

Data is transferred via serial port 25 to or from the shift register. This internal shift register (shown in greater detail in FIG. 4) can be initialized (loaded) with the contents of any row of the VRAM's memory matrix or can have its contents transferred (unloaded) to any row of the VRAM's memory matrix. The advantage of serial port 25 is the fast sequential access that it provides to data stored in the VRAM. Fast sequential access can be made without specification of the individual data addresses.

As shown in FIG. 2, processor 13 includes a dedicated microprocessor chip 33 (e.g., a model ADSP-2101 processor from Analog Devices Corporation), and a memory access controller 35 capable of providing fast serial access to the memory 17 in addition to normal parallel access. As indicated above, the memory 17 includes the VRAM chip 37 and VRAM timing controller 39. VRAM chip 37 may be a model TI44c251 VRAM from Texas Instruments Corporation, or a model MT42C4064 VRAM from Micron Technologies Corporation, for example, and controller 39 may be, for example, a model 74F1764 from Signetics Corporation.

Figure 3:
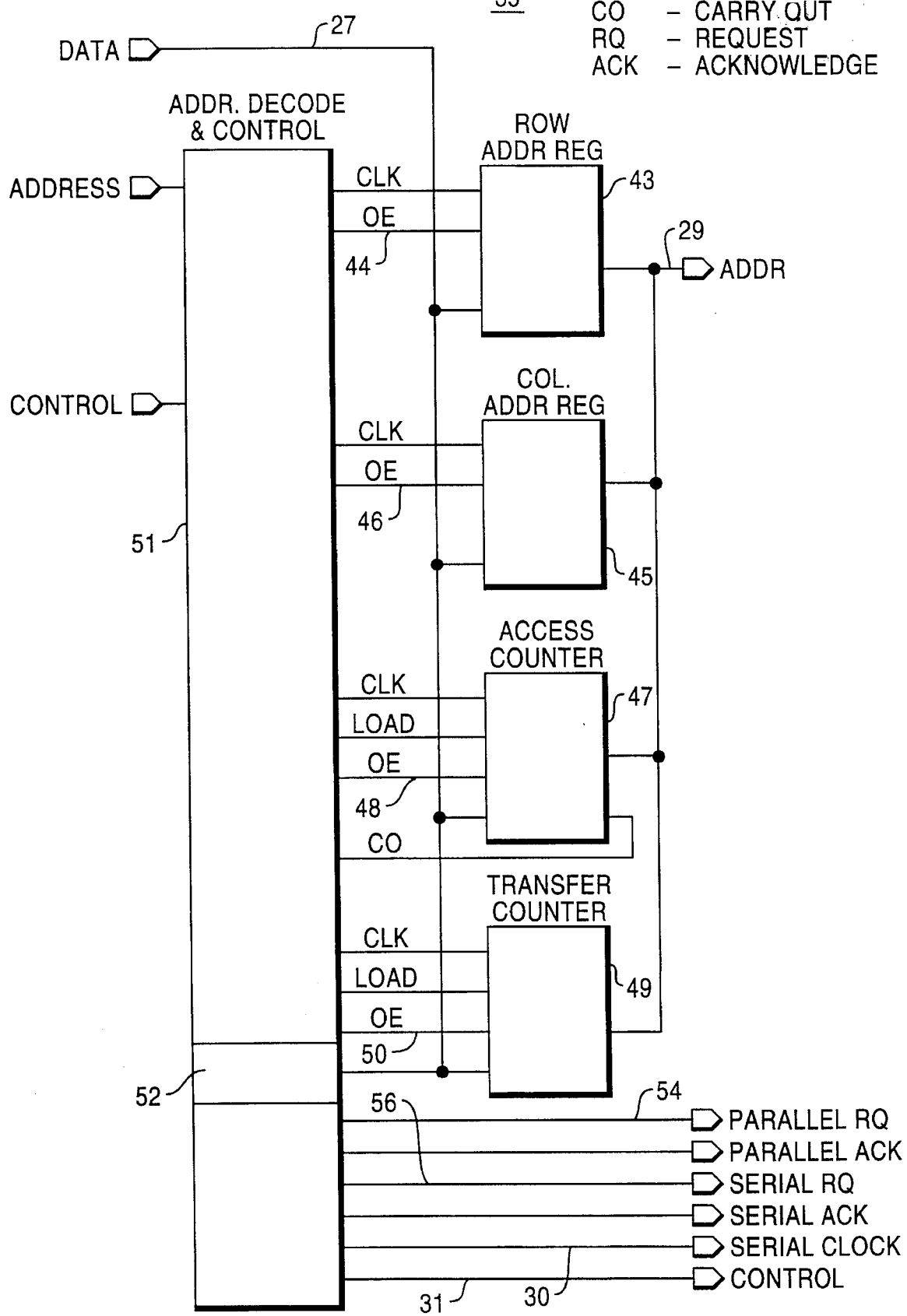
FIG. 3 is a block diagram of the memory access controller of FIG. 2 in greater detail.

As shown in FIGS. 2 and 3, memory access controller 35 includes a row address register 43 and a column address register 45 for specifying individual addresses of data values (e.g., a row address and a column address of a data value in an array of data values) stored in VRAM 37. Memory access controller 35 also includes an access counter 47 and a transfer counter 49. The access counter 47 and the transfer counter 49 are used to denote the current address of the VRAM location accessed by the processor 13 via the serial access port 25. The access counter contains the least significant bits (e.g., nine bits) of the address, and the transfer counter 49 contains the most significant bits (e.g., nine leading bits) of the address. The memory access controller 35 further includes an address-decode and control circuit 51 which maps addresses in the microprocessor's memory space to the various registers of the controller. For example, the address-decode logic of control circuit 51 maps the address space of the microprocessor 33 to the following registers and functions of the control circuit 51.

| Address | Register/function |
|---|---|
| xx0 | ROW ADDR REG (write only) |
| xx1 | COL. ADDR REG (write only) |
| xx2 | NORMAL ACCESS TO VRAM (read/write) |
| xx3 | ACCESS COUNTER (write only) |
| xx4 | TRANSFER COUNTER (write only) |
| xx5 | MISC MODE CONTROL REG (write only) |
| xx6 | SAM ACCESS (would assert SERIAL CLOCK) (read/write) |
| xx7 | FORCED SAM TRANSFER REQUEST (write only) |

Normal Access Mode

Generally, the memory space of the microprocessor 33 is less than the memory space available in the memory 17, and data is stored in the memory 37 In order to allow the microprocessor 33 to access the full address space available in the memory 17, the microprocessor first loads the row address register 43 with the row address of a location in memory 17 by writing to address xx0, then loads the column address register 45 with the column address of that location by writing to address xx1. The microprocessor then accesses address xx2. This causes the memory access controller 35 to apply output-enable (OE) signals 44, 46 (FIG. 3) to the row and column address registers 43, 45, to pass the row and column addresses to the VRAM timing controller 39, and to assert the appropriate RQ (request) signal 52. The VRAM timing controller 39 then completes the memory access by asserting RAS/CAS signals 18, 20 (FIG. 2), and supplying the appropriate address values on the address bus 28 to the VRAM 37 at predetermined VRAM-access times. In this way the microprocessor 33 reads data from and writes data to selected locations (addresses) in the VRAM 37. Data may be written in any sequence.

Fast Sequential Access Mode

After the processor 13 loads the VRAM 37 with data (i.e., lists the data in a sequence suitable for later sequential access), the fast sequential access feature of the system is initialized, as follows. First, the transfer counter 49 (FIG. 3) is loaded with the row address of the first data word required (i.e., the first data word to be accessed), then the access counter 47 is loaded with the column address of that first data word. Next, the mode register 52 is set to serial read mode (for serial data transfer), and a transfer cycle is initiated by accessing address xx7. This access operation results in the memory access controller 35 applying output-enable (OE) signals 48, 50 to the access counter 47 and to the transfer counter 49, respectively. This allows the row/column addresses in the counters 47, 49 to be passed to the VRAM timing controller 39, and allows the serial request signal (RQ) 56 to be applied to controller 39. In response to the serial request signal 56, the VRAM timing controller completes the transfer cycle by applying the RAS/CAS signals 18, 20 and the transfer signal 58 (FIG. 4) to the VRAM while supplying the row/column addresses, on the address bus 27. This action of completing the transfer cycle results in the transfer of the data values in the memory locations having the row address to the SAM or shift register 41. The associated column address in the access counter 47 indicates which data value in the SAM is the first to be shifted out.

The processor then accesses the data list sequentially, by accessing the SAM ACCESS address (xx6). Each time the processor asserts (specifies) the SAM ACCESS address, the following events occur. First a serial clock signal 30 (FIGS. 2 and 3) is asserted (applied to VRAM 37), resulting in the next data word being clocked out of the SAM 41 and transmitted to the processor via the serial access port 25 (FIG. 1). Then, the access counter 47 is decremented and, when the access counter value (i.e., the contents of the access counter) equals zero, the transfer counter 49 is decremented. After which, a transfer cycle is initiated (forced) by the memory access controller 35 (FIG. 2). Next, the row address is obtained from the transfer counter 49, and the SAM's start address is obtained from the access counter 47 (the contents of which would now read 0). In this way, the processor sequentially accesses the data in the VRAM without supplying any intermediate addresses. The processor is required to supply the initial (starting) address only.

Use of VRAMs which have split SAMs (each SAM having one half the width of a row in the VRAM matrix) allows one half of the SAM to be involved in the transfer of data, while the other half is involved in the shifting of data. This type of VRAM architecture allows the processor to sequentially access data from the VRAM without requiring the processor to be involved with VRAM's transfer cycles. The transfer cycles are transparent to the processor.

Figure 5:
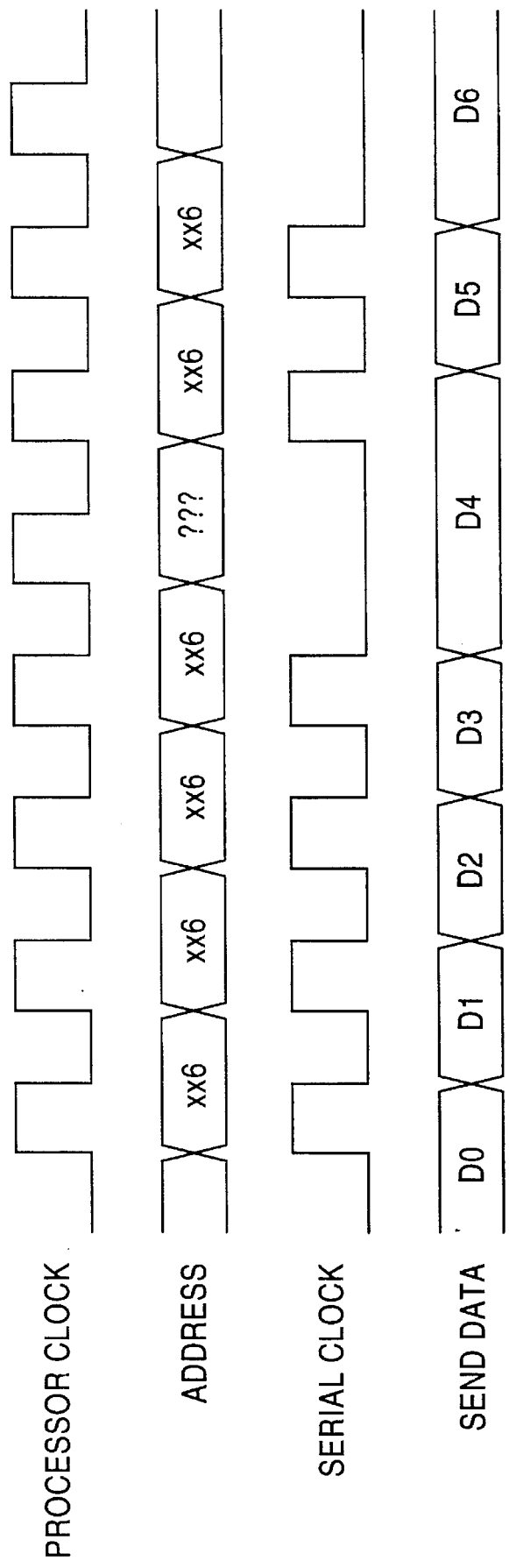
FIG. 5 is a waveform diagram showing timing relationships between clock signals and data and memory address values transferred between the DSP and VRAM of the system of FIG. 1.

A time relationship between clock signal, address access, and serial data output is shown in FIG. 5.

Figure 6:
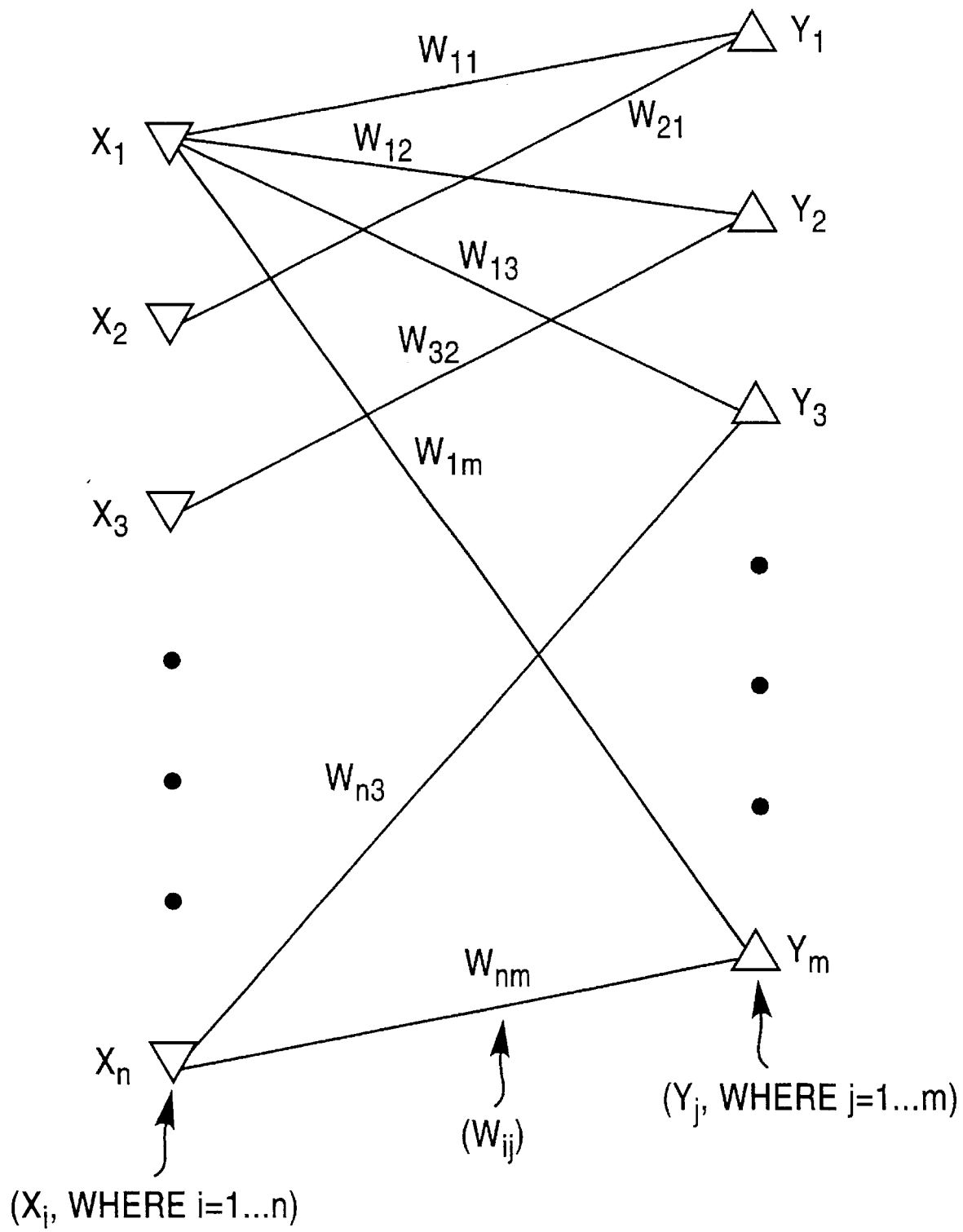
FIG. 6 is a graphic representation of a neural network, showing input values ($X_i$), weight values ($W_{ij}$), and output values ($Y_j$).

As indicated previously, the ability of the system to perform fast sequential data access operations is important for performance of compute-intensive sequential operations (e.g., fast multiply/accumulate operations that are common to neural net computations. An example of a neural net configuration is shown in FIG. 6. An associated neural net computation is shown by equation (1) below for one layer of the neural net.

In preparation for performing a neural net computation, the system 11 (FIG. 1), upon receipt of weight data ($W_{ij}$) from the host computer (not shown), develops (builds) a table of the weight data in memory 17 by loading the weight data via parallel port 23 into the memory in a predetermined sequence (as shown in Table I below) suitable for sequential access subsequently. The table may be represented as an array of weight values (e.g., a 512×512 matrix of memory locations/addresses, each location having a four-bit weight value).

TABLE I

| (W_{i,j}) | | | | | | | | | |
|---|---|---|---|---|---|---|---|---|---|
| (FIRST LAYER) | | | | | | | | | |
| $W_{1,1}$ | $W_{1,2}$ | $W_{1,3}$ | $W_{1,4}$ | $W_{1,5}$ | $W_{1,6}$ | $W_{1,7}$ | $W_{1,8}$ | $W_{1,9}$ | $W_{1,10}$ |
| $W_{2,1}$ | $W_{2,2}$ | . | . | . | . | . | . | . | $W_{2,10}$ |
| . | . | . | . | . | . | . | . | . | . |
| $W_{5,1}$ | $W_{5,2}$ | . | . | . | . | . | . | . | $W_{5,10}$ |
| (SECOND LAYER) | | | | | | | | | |
| $W_{1,1}$ | $W_{1,2}$ | $W_{1,3}$ | $W_{1,4}$ | $W_{1,5}$ | | | | | |
| $W_{2,1}$ | . | . | . | $W_{2,5}$ | | | | | |
| $W_{3,1}$ | . | . | . | $W_{3,5}$ | | | | | |
| (THIRD LAYER) | | | | | | | | | |
| $W_{1,1}$ | $W_{1,2}$ | $W_{1,3}$ | | | | | | | |
| $W_{2,1}$ | $W_{2,2}$ | $W_{2,3}$ | | | | | | | |

The above table represents a sequentially arranged three-layer list (data list) for performing n×m computations, where n represents the number of inputs, and m represents the number of outputs. The output of one layer becomes the input to the next layer. For example, for the first layer there are n=10 inputs (columns) and m=5 outputs (rows). For the second layer there are n=5 inputs and m=3 outputs, and for the third layer there are n=3 inputs and m=2 outputs.

As an alternative to loading the VRAM 37 via parallel port 23, loading may be achieved via serial port 25 and SAM 41.

After the weight values ($W_{ij}$) are stored in the memory 17, the input values ($X_i$) from the host computer are stored locally in the processor 13. (Typically, the quantity (n) of input values number about one hundred). The DSP then performs the multiply-accumulate operation shown in equation (1) below for each output ($Y_j$):

$$Y_j = \sum_{i=1}^{n} W_{ij} X_i \quad (1)$$

The output value $Y_j$ may be adjusted to ensure that it falls within a predefined range of values or meets a predefined threshold. When so adjusted the adjusted value (Y') may be expressed as a function of $Y_j$ as follows:

$$Y_j = f\left( \sum_{i=1}^{n} W_{ij} X_i \right) \quad (2)$$

where n represents the number of input (X) values.

In the case where m represents the number of output (Y) values, the total number of outputs (Z) per layer may be expressed as:

$$Z = \sum_{j=1}^{m} Y_j \quad (3)$$

When n=100 and m=30, for example, the DSP 13 performs 3000 MAC (multiply/accumulate) operations for each layer of the neural net.

In the event there are k layers, with each layer having Z outputs, the total number of outputs ($O_T$) may be expressed as:

$$O_T = \sum_{i=1}^{k} Z_i \quad (4)$$

and the total number of multiply/accumulate operations ($O_P$) may be expressed as follows:

$$O_P = \sum_{i=1}^{k} Z_i Z_{i-1} \quad (5)$$

where, $Z_i$ represents the initial number of inputs (X) to the neural net.

To accommodate such computer-intensive multiply-accumulate operations, the system configuration (architecture) enables the processor 13 to access (via the serial access port of the memory 17) the weight values in the memory at a rate of up to $40 \times 10^6$ words (memory locations) per second, significantly faster than normal (parallel) DRAM access rates of about $5 \times 10^6$ words (memory locations) per second.

While the present invention is susceptible of embodiment in various forms, there is shown in the drawings and described in the specification a presently preferred embodiment, with the understanding that the present disclosure is to be considered as an exemplification of the invention, and is not intended to limit the invention to the specific embodiment illustrated.

What is claimed is:

1. A data access system comprising:

memory means including a Video Random Access Memory (VRAM) for storing data words, said VRAM having a parallel access port and a serial access port;

processing means including a processor having a first input–output port and a second input–output port, and a data bus for coupling said second input–output port of the processor to said parallel and serial access ports of the VRAM;

said processor being responsive to data words applied via said first input–output port for transferring said applied data words, via said second input–output port, said data bus, and said parallel access port, to said VRAM for storage, and for accessing a group of said stored data words as a serial sequence via said serial access port in response to said processor supplying only an initial starting address of a first data word of said group of stored data words when said system is operated in a fast sequential mode.

2. The system as in claim 1 wherein said VRAM includes a Serial Access Memory (SAM) for receiving data words transferred from said VRAM and for transferring said data words as a serial data sequence to the processor.

3. The system as in claim 2 wherein said processor also includes a memory-access-controller for controlling the transfer of data between said processor and said VRAM.

4. The system as in claim 3 wherein said memory-access-controller includes a row address register and a column address register for specifying a row address and a column address, respectively, of a selected location in memory for storage of a transferred data word when said system is operated in a normal mode.

5. The system as in claim 4 wherein said memory-access-controller also includes a transfer counter for placing thereon most significant bits for a row address of said initial starting address of said first word for addressing a data word in said VRAM; and said memory-access-controller also includes an access counter for placing least significant bits of a starting column address thereon for addressing said data word in said VRAM.

6. A data access system comprising:

a dynamic video random access memory (VRAM) for storing data, with said VRAM having a parallel access port and a serial access port;

a digital signal processor (DSP) having a first input/output port and a second input/output port;

a data bus coupling said second input/output port of said DSP with said parallel and serial access ports of said VRAM;

said VRAM having a memory matrix, a timing controller, and a serial access memory (SAM), with said SAM being coupled to said memory matrix and said serial access port;

said timing controller upon receiving an initial starting address from said DSP for a first data word of a group of data words to be accessed in a fast sequential mode of operation being effective to:

pass row/column addresses to said VRAM and transfer the data words for said group of data words at said row/column addresses to said DSP via said SAM with said DSP supplying only said initial starting address of said first data word.

7. The data access system as claimed in claim 6 in which said timing controller includes a mode register responsive to a first signal which places said data access system into a regular mode of operation in which said DSP receives one data word for each row/column address supplied to said VRAM by said DSP, and in which said mode register is responsive to a second signal which places said data access system into said fast sequential mode of operation.

8. The data access system as claimed in claim 6 in which said timing controller includes:

a first counter for placing most significant bits (MSBs) of a starting row address thereon;

a second counter for placing least significant bits (LSBs) of a starting column address thereon for addressing a data word in said VRAM; and a clock for actuating said second counter until a predetermined count is reached and for actuating said first counter upon said predetermined count being reached to provide new addresses as said second counter is again actuated to provided new addresses to said VRAM without said DSP supplying intermediate addresses to said VRAM.

9. The data access system as claimed in claim 6 in which said SAM has a first half and a second half to enable one of said first and second halves to receive data words from said VRAM while the remaining one of said first and second halves shifts data words to said DSP, with the receiving and shifting of data words via said SAM being transparent to said DSP.

10. A method of accessing data words in a Video Random Access Memory (VRAM) comprising the steps of:

(a) using a digital signal processor (DSP) to indicate an initial starting address for a group of data words to be accessed in a sequential manner from said VRAM;

(b) setting the most significant bits of an initial starting address for the group of data words to be accessed on a first counter, and setting the least significant bits of said initial starting address on a second counter;

(c) actuating said second counter until said second counter reaches a predetermined count;

(d) actuating said first counter by one upon said second counter reaching said predetermined count;

(e) repeating said steps (c) and (d) until ending addresses for said group of data words have been reached;

(f) using said outputs of said first and second counters as addresses to said VRAM to sequentially supply said group of data words to said DSP without said DSP having to supply any intermediate addressees to said VRAM.

11. The method as claimed in claim 10 in which said using step (f) includes the step of:

(f-1) using a Serial Access Memory (SAM) having first and second halves to enable one of said first and second halves to receive said data words from said VRAM while the remaining one of said first and second halves transfers said data words to said DSP.

12. The method as claimed in claim 11 in which said actuating steps (c) and (d) are effected by decrementing.

13. A method of accessing data words from a Video Random Access Memory (VRAM) comprising the steps of:

(a) using a digital signal processor (DSP) to indicate an initial starting address for a group of data words to be accessed in a sequential manner from said VRAM;

(b) setting the most significant bits of an initial starting address for the group of data words to be accessed on a first counter, and setting the least significant bits of said initial starting address on a second counter;

(c) actuating said second counter until said second counter reaches a predetermined count;

(d) actuating said first counter by one upon said second counter reaching said predetermined count;

(e) repeating said steps (c) and (d) until ending addresses for said group of data words have been reached;

(f) using said outputs of said first and second counters as addresses to said VRAM to sequentially supply said group of data words to said DSP without said DSP having to supply any intermediate addresses to said VRAM.

14. A method using a Video Ram Access Memory (VRAM) and a digital signal processor (DSP) for performing fast multiply/accumulate operations comprising the steps of:

(a) storing data words via a parallel port of said VRAM so as to be suitable for sequential accessing;

(b) using said (DSP) to indicate an initial starting address for a group of said data words to be accessed in a sequential manner from said VRAM;

(c) setting the most significant bits of an initial starting address for the group of data words to be accessed on a first counter, and setting the least significant bits of said initial starting address on a second counter;

(d) actuating said second counter until said second counter reaches a predetermined count;

(e) actuating said first counter by one upon said second counter reaching said predetermined count;

(f) repeating said steps (d) and (e) until ending addresses for said group of data words have been reached;

(g) using said outputs of said first and second counters as addresses to said VRAM to sequentially supply said group of data words to said DSP for use by said DSP in said fast multiply/accumulate operations without said DSP having to supply any intermediate addresses to said VRAM.

* * * * *